United States Patent [19]

Harris, Jr. et al.

[11] Patent Number: 6,144,975
[45] Date of Patent: Nov. 7, 2000

[54] COMPUTER SYSTEM FOR INTELLIGENT DOCUMENT MANAGEMENT

[75] Inventors: Allen W. Harris, Jr., Briarcliff Manor, N.Y.; Kurt E. Liberatore, Franklin; Shawn D. Persels, Northboro, both of Mass.

[73] Assignee: FMR Corporation, Boston, Mass.

[21] Appl. No.: 09/073,011

[22] Filed: May 5, 1998

[51] Int. Cl.$^7$ .................................................. G06F 17/21
[52] U.S. Cl. .................................................. 707/901
[58] Field of Search .................................................. 107/901

[56] References Cited

U.S. PATENT DOCUMENTS

| | | | |
|---|---|---|---|
| 5,457,792 | 10/1995 | Virgil et al. | 707/104 |
| 5,878,258 | 3/1999 | Pizi et al. | 709/320 |
| 5,893,098 | 4/1999 | Peters et al. | 707/10 |
| 5,911,776 | 6/1999 | Guck | 709/217 |
| 6,009,442 | 12/1999 | Chen et al. | 707/500 |
| 6,035,323 | 3/2000 | Narayen et al. | 707/501 |
| 6,073,137 | 6/2000 | Brown et al. | 707/100 |

OTHER PUBLICATIONS

Elgin "Project 4.0—Mainstream Project Management" Windows Magazine, May 1994, No. 505, pp. 108.

E–messaging: Sctel unvils Octlink: new messaging technology connects the world; worlds first 'messaging post office' network services provides simple fast, reliable messaging. Edge on & about AT&T. vol. 10 No. 364, Jul. 1995, pp. 3(1).

*Primary Examiner*—Jack Choules
*Attorney, Agent, or Firm*—Fish & Richardson P.C.

[57] ABSTRACT

A computer system includes several inputs for receiving documents being transmitted via different media, and several outputs for transmitting outgoing documents via different media. An input component is coupled to each of the inputs and an output component is coupled to each of the outputs. The input component and the output component each communicate with a processing system providing database services. The input component converts requests communicated through inputs into service items that typically include at least one document production item. Service items are communicated to the processing system, which tracks them. The processing system passes the service items on to the output component, which instructs appropriate ones of the outputs to produce output documents. Each of the input manager and output manage communicate with the processing system via a generalized API, and communicates with respective inputs and outputs via API's specific to those machines. The input manager and the output manager thereby serve as functional abstraction layers between the processing system and the document inputs and outputs.

6 Claims, 5 Drawing Sheets

Figure 1

| SERVICE ITEM | | 30 |
|---|---|---|
| SERVICE TYPE | 31 |
| NAME 1 | 32 |
| ADDRESS 1 | 33 |
| FAX 1 | 34 |
| NAME 2 | 35 |
| ADDRESS 2 | 36 |
| FAX 2 | 37 |
| SERVICE TYPE | 31 |
| ⋮ | |

COMPUTER SYSTEM FOR INTELLIGENT DOCUMENT MANAGEMENT

BACKGROUND OF THE INVENTION

The invention relates to a computer system that provides integrated handling of print, data, voice, and other types of communications.

Businesses communicate internally and with their customers in several different ways other than through person-to-person contact. For example, communications can be conducted through postal mailings, via private delivery services, by facsimile, by employing electronic data transfer, such as e-mail sent over the Internet, and with voice-mail. Although electronic communications are becoming more widely used, most business communication continues to be on paper media. Often, a sequence of correspondence must be sent and responded to in order to complete a transaction, e.g. a sale.

Processing paper transactions can take substantial manpower. Some outgoing communications can be automated with the aid of computer systems. For example, mass mailings can be substantially automated when a mailing list is in a computer data base. In addition, document scanners can be used to read received documents into a database. However, these functions are typically not coordinated in an integrated system. Systems for automated document printing or publishing typically do not communicate with systems that capture documents. Tracking documents in a sequence of correspondence is usually done manually. This can be time consuming and can be a source of errors that cause delays in completing a transaction.

SUMMARY OF THE INVENTION

The invention provides a system for automated communication processing and tracking.

As used in the following description, the term "component" is intended to mean a software application or an encapsulated subsystem. A "software application" is an executable program or script, which can be either GUI-based or server process. An "encapsulated subsystem" is a collection of applications and subsystems, which together form a coordinated functional unit with its own internal control systems.

The invention provides a document processing system that includes a plurality of different document input media and a plurality of different document output media. The system also has a processing system, including a database, a database engine and a workflow manager. An input component is adapted to receive communications transmitted from each of the plurality of document input media. The input component includes a generalized API that is communicatively coupled with the processing system, wherein each received communication includes a request for producing and transmitting at least one communication over a selected one of the plurality of document output media. The input component is also adapted to convert the request in each received communication into a service item and to communicate the service items to the processing system, wherein each service item includes a stack of tasks necessary for completing the corresponding request. An output component, which includes the generalized API, is adapted to receive service items from the processing system, and to direct communications to selected ones of the plurality of document output media in response to the service items.

The document outputs can include a fax system, a print media system, an e-mail system, and an electronic data file transmission system, and the document inputs can include the fax system, the e-mail system, and the electronic data file transmission system. The e-mail system and the electronic data file transmission system can be coupled to the Internet.

The system can further include a document image recognition component adapted to create image data from document hard copies, and further adapted to extract information from selected fields of the image data and to create service items from the extracted information. The image recognition component communicates the service items with the processing system.

The system can additionally include a report manager component communicating with the processing system. The report manager component is adapted to create activity reports based on information retrieved from data bases in processing system, wherein the activity reports are transmitted through the output component.

The invention also provides a method of managing documents being input and output via different media. The method includes steps of receiving a service order that comprises a request to produce at least one document, converting the service order into a service item comprising a group of canonical fields in which information representing different tasks necessary for completing of the service order are placed, communicating the service item to a processing system having an associated data base and storing the service item in the data base, communicating the service item to a output component, converting at least one task of the service item into instructions for an output component and transmitting the instructions to the output component, and producing the requested document with the output component.

DETAILED DESCRIPTION OF THE INVENTION

The invention provides a system for substantially automated document handling that coordinates the operations of disparate communication handling components in an integrated architecture. The communication handling components can be components for sending and receiving facsimile communications, for e-mail communication, for printing paper documents, for reading paper documents, and the like. Together, the system provides a "document factory" (DF) for integrated handling of communications.

Communication handling components are typically designed for a single special purpose. The hardware and software needed to produce a mass mailing is not the same as for a system configured to scan documents for selected information. For example, two components produced by different vendors may have different API's with different communication protocols. For these reasons, different special purpose systems will typically have different interfaces with different levels of integratability. To integrate one component with one set of protocols with another component with a different set of protocols requires a custom adapter to integrate the two systems. This is not a serious problem for just a few components, but as the number of components interconnections increases, the number of required adapters approaches the square of the number of components.

This can make an integrated system very difficult to operate. Components that are highly interconnected can become loaded with custom interfaces, which can make the system unmanageable. Each component brings with it different approaches to configuration management and software distribution. As the number of components integrated in a single system grows, configuration management, software upgrades, and software distribution can become more complex. Each new application typically approaches security differently. Replacing a component that is highly interconnected could take tremendous effort. The task of tracking the activities and status of all the components can also be very complex.

Figure 1:
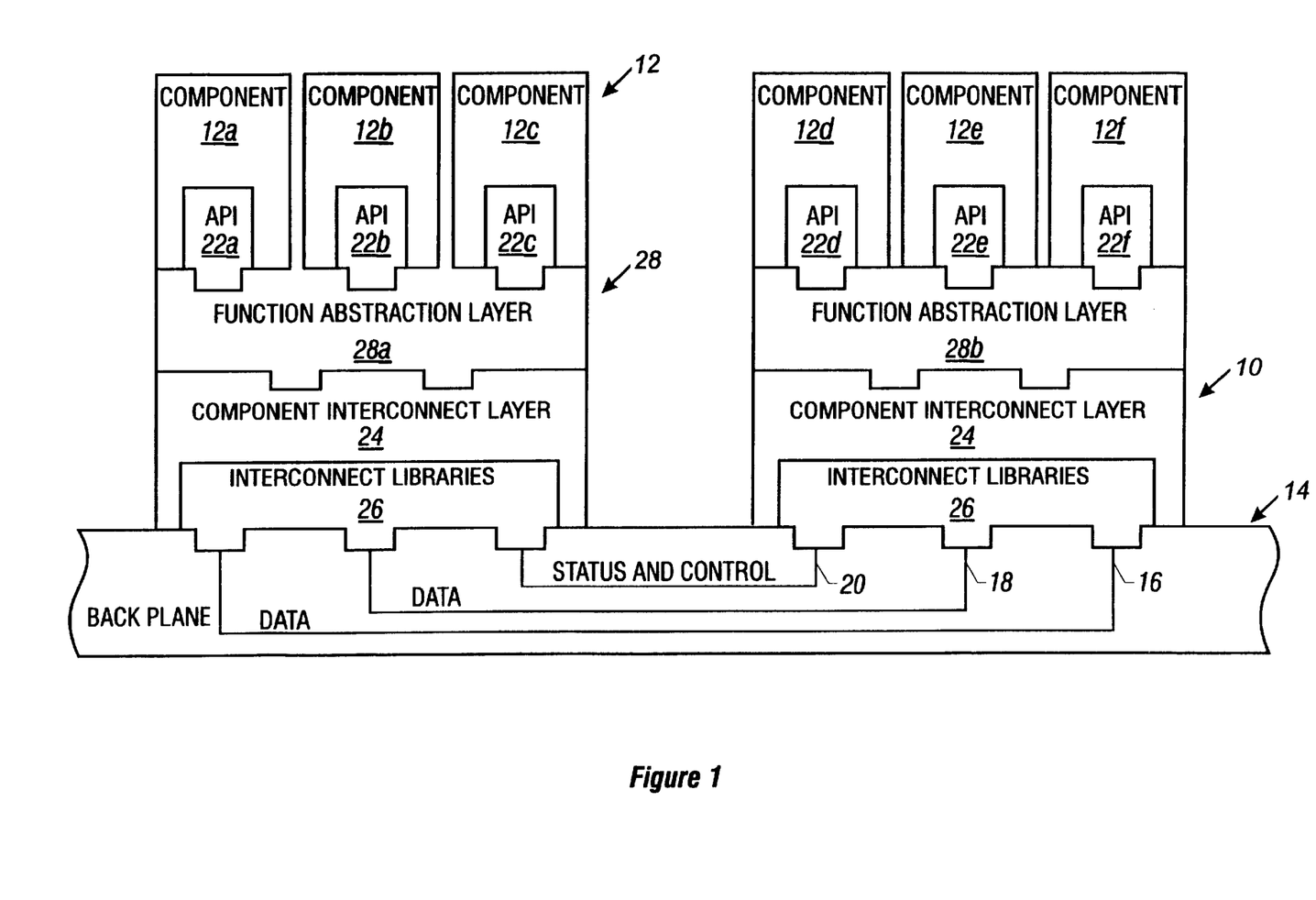
FIG. 1 is a block diagram illustrating a communication architecture according to the invention.

Referring to FIG. 1, a document handling system, or "Document Factory" (DF) 10, that illustrates the concept of the invention includes a variety of hardware and software components 12A–F integrated into a single architecture. (A component will be referred to generally by reference numeral 12, while specific components will be referred to by reference numeral 12A–12F.) All components 12 receive and/or send communications through a software backplane 14. Backplane includes data busses 16, 18, and a status and control bus 20. Components 12A–F may be provided by more than one vendor. Components 12A–F, in their native state, provide different levels of integratability. Each has its own respective API 22A–F, and each may implement its integration interface in a different way. To reduce the number of custom interconnections, backplane 14 does not connect directly with components 12A–F but instead includes a component interconnect layer (CIL) 24 having interconnect libraries 26 for enabling communications through backplane 14. CIL 24 also includes a function abstraction layer (FAL), referred to generally by reference numeral 28, that couples to individual components 12A–F via their respective API's 22A–F.

There can be more than one CIL 24 and associated FAL 28, e.g. FAL's 28A, 28B. Each FAL 28A, 28B is adapted to provide communication with a type of component 12 that performs a specific function. For example, components 12A–12C can be fax machines, all communicating with one FAL 28A. Communications between a particular FAL 28 and the attached components necessarily are tailored to each attached component's API. However, communications between a FAL 28 and CIL 24 are more generalized. Common protocols are used throughout system 10 for communications between CIL 24 and FAL 28. Thus, if a component, e.g. component 12B, is changed to a similar component made by a different vendor, wherein the new component has a different API than component 12B, only a small part of FAL 28A needs to be changed. All other communications and connections in DF 10 remain the same.

CIL 24 functions as a system-specific, unified, document factory API for communications between components 12 within DF 10. It provides a common language for DF 10. Even without using a software backplane 14, CIL 24 provides a simplified means for communicating between disparate types of components in DF 10.

DF 10 provides a range of document services to a client, which may be at a remote location. The client may be a business, such as a telephone company, providing a variety of services to thousands or even millions of customers. The client may have hundreds of representatives, each selling one or more of the client's services to a subset of the client's customers and to potential customers. Communications between the client and its customers and potential customers may include mailings, fax communications, e-mail, electronic data and the like. DF 10 is adapted to manage many of these communications. It includes systems that recognize communications and that log events. DF 10 can also do something intelligent based upon the recognized communication. For example, DF 10 can be adapted to store a record of an event, to ship a new communication, to provide a status report, and to communicate with a customer.

Figure 2:
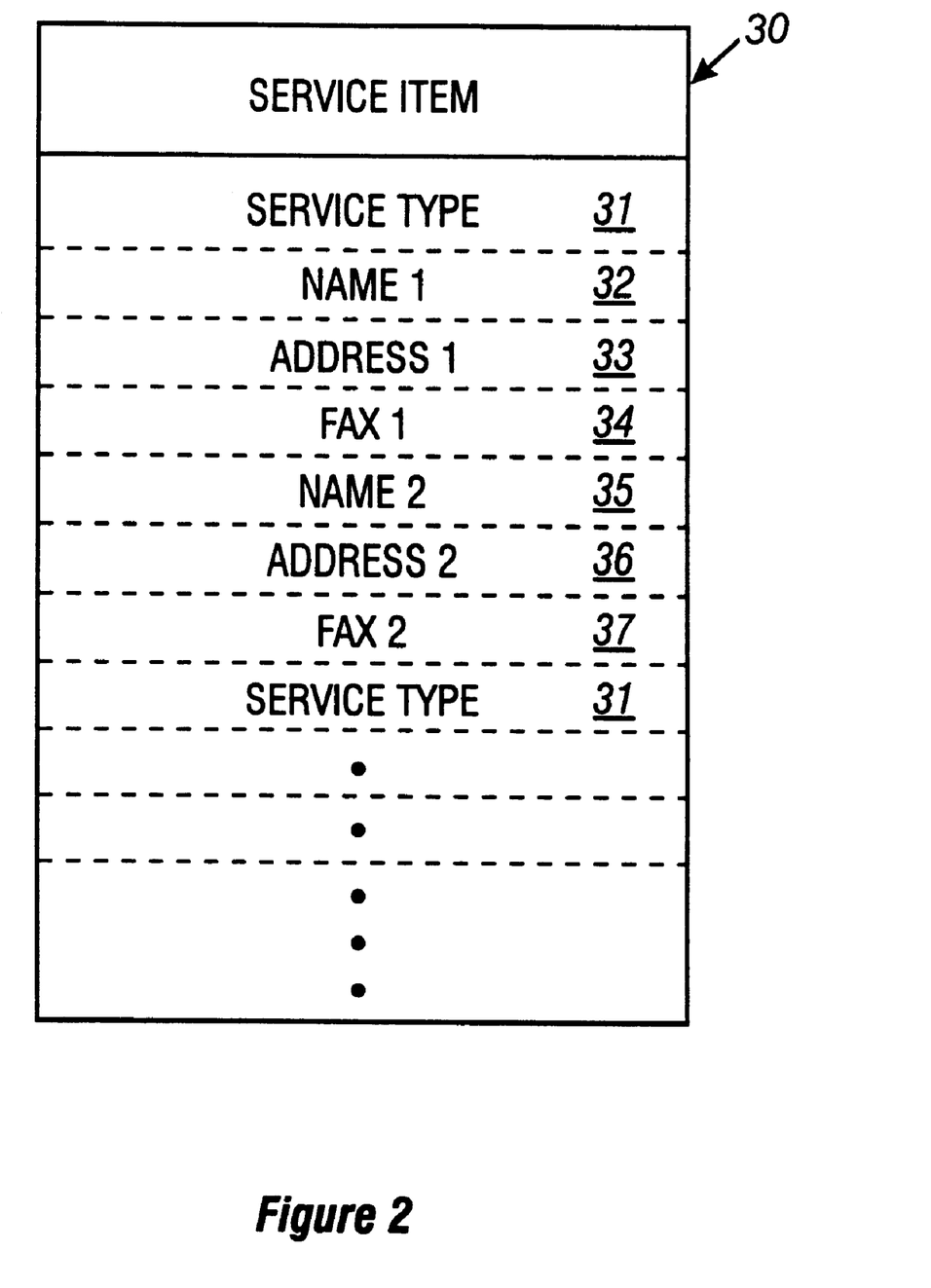
FIG. 2 is a representation of a service item.

DF 10 does these functions by creating and managing "service items." Referring now to FIG. 2, a service item 30 is a data construct that has different fields of information. Service item 30 includes several canonical fields. One or more fields are labeled service type 31. These fields include information setting forth the task to be done and what steps are to be taken in carrying out the task. Service item 30 also includes fields for information about corresponding parties. In the illustrated example, service item 30 includes two names, NAME1 32 and NAME2 35, and corresponding addresses, ADDRESS1 33 and ADDRESS2 36, and fax numbers, FAX1 34 and FAX2 37. Information about additional parties can also be included in service item 30. A service item may be created by DF 10, for example, when a client's sales representative submits an order. Carrying out the service order 30 may involve, for example, creating and sending out a first piece of correspondence to a NAME1 32, waiting a specific time period for a response, interpreting the response, and based on the response sending a second correspondence to NAME1 and a third type of correspondence to NAME2. Information about what to do to carry out the order is contained in the service item itself. The tasks are stacked in the canonical fields of the service item in the order to be completed.

Thus, service items 30 are communications that have a stack of canonical fields that identify tasks functionally. Service items 30 are the universal language of DF 10, and serve as the CIL 24 in the system.

Figure 3A:
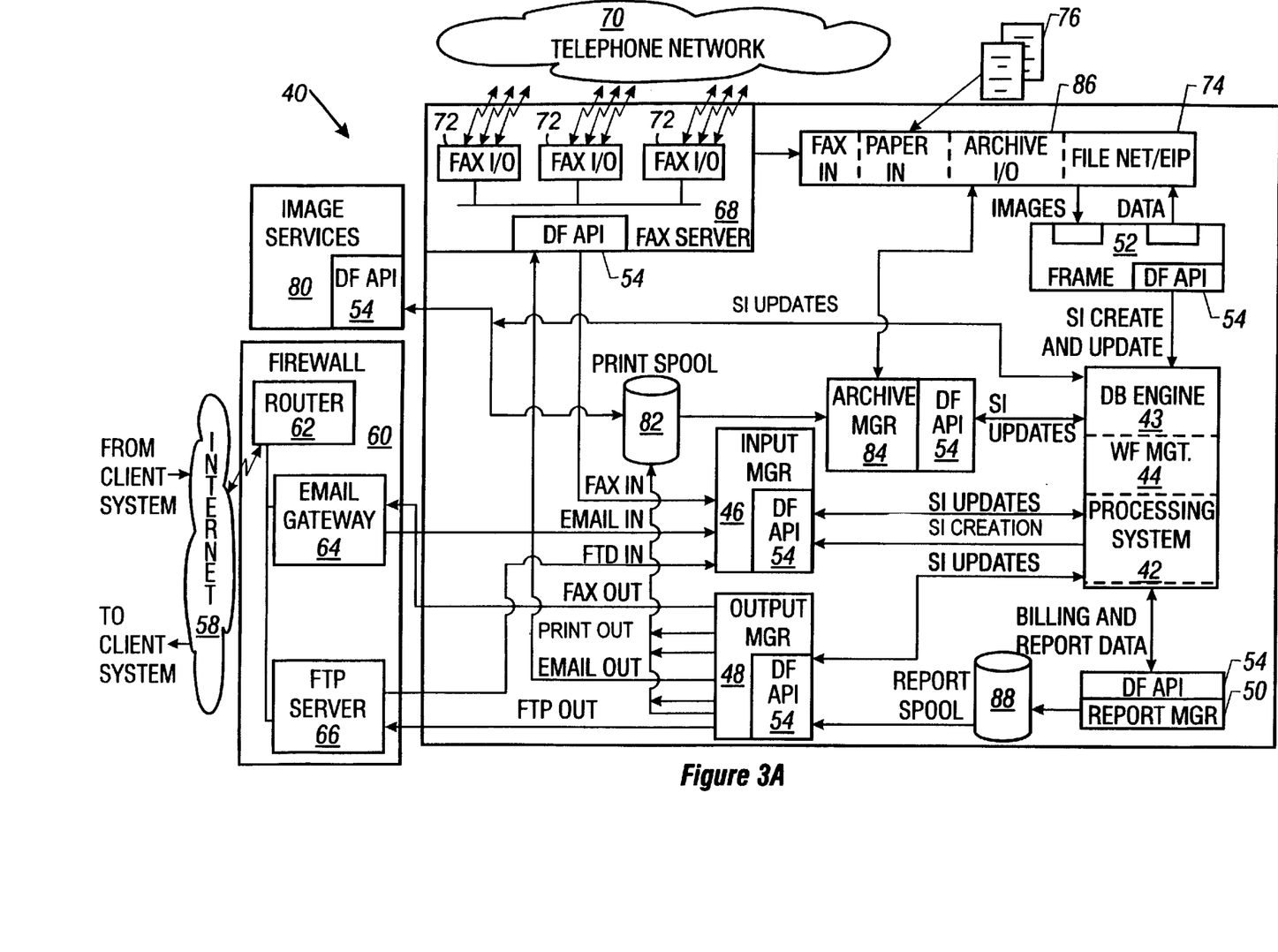
FIGS. 3A and 3B together form a functional block diagram of a document factory system according to the invention.
Figure 3B:
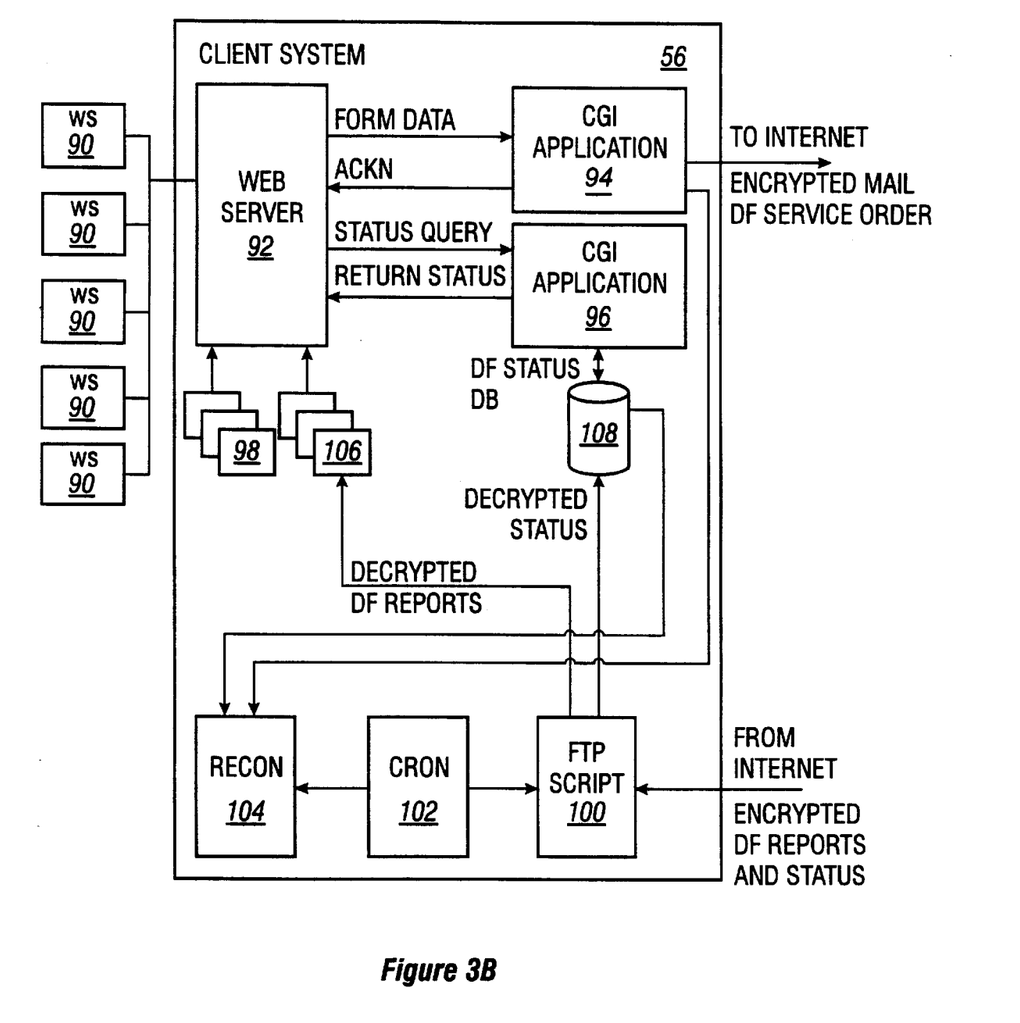

Referring now to FIGS. 3A and 3B, a specific example of a DF 40 includes components for creating and processing service items at a local site 41. A central processing system 42 includes a database (DB) engine 43 and a workflow management system (WF MGT) 44, each of which includes associated data storage capacity. Processing system 42 communicates with an input manager 46, an output manager 48, a report manager 50, and a recognition engine (FRAME) 52, each of which include a document factory (DF) API 54. Thus, processing system 42 can communicate with input manager 46, output manager 48, report manager 50 and FRAME 52 in a manner that requires little modification if any functional component of the system is changed.

Input manager 46 and output manager 48 are both multi-channel, multi-media facilities that enable DF 40 to communicate with one or more clients. A client can have its own network, e.g., client system 56 that is capable of communicating with DF 40 via e-mail and electronic data transfer over the Internet 58. DF 40 is protected from unwanted intrusions from the Internet 58 by a firewall 60 that includes a router 62, an e-mail gateway 64 and an FTP server 66. E-mail being sent from client system 56 to DF 40 is routed via e-mail gateway 64 to input manager 46; e-mail being sent to client system 56 from output manager 48 is routed through e-mail gateway 64. Data files being communicated from client system 56 to input manager 46 are routed through FTP server 66; data files being sent from output manager 48 to client system 56 are also routed through FTP server 66.

In addition, input manager 46 and output manager 48 are each communicatively coupled with a fax server 68. Fax server 68 is a high volume, fault tolerant faxing engine adapted for sending and receiving fax documents over a telephone network 70. Fax server 68 is coupled with several fax input/output (I/O) facilities 72 for sending fax documents to and receiving fax documents from clients. Fax server 68 also includes a DF API 54 for electronically communicating with input manager 46 and output manager 48.

DF 40 also has an image capture system (FILENET/EIP) 74 that is capable of receiving printed documents such as fax documents and other papers 76, and converting them into image files. An image recognition engine, FRAME 52, receives image files from (FILENET/EIP) 74, extracts information from the images, and passes the extracted information on to processing system 42.

Output manager 48 sends electronic images and text for printing to image services 80, which in the described embodiment is located at a remote site. Print jobs are first stored in a print spool 82 before being sent on to image services 80. Image services 80 takes the print jobs and produces paper output (not shown) that can be mailed or otherwise distributed to a client or a client's customers. Image services, like other components of DF 40, includes a DF API 54.

Report manager 50 is a component that produces reports for transmission to clients through output manager 48. Reports can be temporarily stored in a report spool 88 before being output. Like the other components of DF 40, report manager 50 includes DF API 54. Reports pass through FTP server 66 and then through router 62 in firewall 60 for transmission through the Internet 58.

All paper documents are logged in an archive manager 84. Archive manager 84 receives input from three sources, print spool 82, processing system 42, and an archive I/O 86 located in FILENET/EIP 74. Archive manager 84 also has a DF API 54.

Referring now to FIG. 3B, client system 56 can be a distributed system having local area networks (LANS) linked in a wide area network (WAN). Five workstations (WS) 90 are illustrated in the drawing, however, client system can include hundreds or even thousands of WS's 90 that are used by sales personnel, by billing personnel, by maintenance personnel, and the like. Client system 56 includes a web server 92 and a pair of common gateway interface (CGI) applications 94, 96 coupled to web server 92. CGI application 94 creates encrypted e-mail documents that include client service orders. CGI application 96 produces status queries and returns status reports to web server 92.

Data forms 98 for service orders and status queries are input into web server 92, which passes the data contained in the forms to an appropriate one or the other of CGI applications 94, 96. Data forms 98 are not paper forms. Rather, they are screens created at WS's 90 that have fields of data for producing one or more documents. A form 98 for a service order may contain several fields of information, such as the order number, the name, address and telephone number of one or more correspondents, and various attributes of a transaction represented by a document that is to be produced according to the service order. The transaction may be a purchase order, a response to a request for service to equipment, a response to an inquiry, or the like. CGI application 94 scrapes the service order form data off of the user's WS 90 screen, and creates an e-mail file with ASCII data containing the service order information. The e-mail is encrypted, for example, using "pretty good privacy" (PGP), and published by CGI application 94 on Internet 58. On a regular basis, e.g., every few minutes, DF pulls the published e-mail containing the service order off of client system 56. The e-mail containing the service order is then pulled through router 62 and e-mail gateway 64 and transmitted to input manager 46.

If CGI application 94 was successful in creating the e-mail with all the proper fields complete, and successful in delivering it, then this is acknowledged with an immediate return message (ACKN) to the user who generated the form. For example, if a customer submits a purchase order over the Internet 58, and has submitted valid information, such as credit card number, name and address, the acknowledgement message will be returned confirming that the order was submitted, providing an order number and other information.

When input manager 46 receives the service order, a cascade of events is triggered. Input manager 46 decrypts the service order text and creates a service item (e.g., service item 30 described above with reference to FIG. 2) by calling on DB engine 43 and WF Manager 44. These applications together create a service item having a sequence of steps. The applications map all the information from the service order into the canonical fields of the service item, e.g., fields 31–37 in FIG. 2. These fields, as described earlier, include pertinent information about correspondents and a stack of tasks to be completed. A service item may require several documents to be created and transmitted to different parties. For example, a utility company purchase order for new customer service may require a letter of authorization, a communication from the utility provider to the customer, and an internal communication within the utility provider.

All items that cross the threshold of input manager 46 are captured, employing DB engine 43 as a data base to save the information. This information can provide a collection of market, channel of trade, and customer sensing data to the client. This data, which has been extracted from incoming documents such as service orders, can be very useful to the client in monitoring trends within its business.

After a service item is created, it must be processed. WF Manager 44 in processing system 42 keeps track of the status of the stack of tasks in a service item, and indexes the items in the stack as the tasks are done. Updated service items are passed along to the appropriate component in DF 40, such as input manager 46, output manager 48, report manager 54, archive manager 84 and FRAME 52. These components actively respond to the service items by carrying out each assigned task and also by communicating completion of the task back to processing system 42. Each component will update the service item and send it back to processing system 42. This enables processing system 42 to keep track of the service item's progress.

If a task is not completed, e.g., a fax does not get a confirmation receipt that the entire fax went through to the addressee's fax machine, an error message is returned on the service item. WF management 44 will respond by updating the service item. The task may be attempted again, or other steps may be taken to correct the situation. WF manager 44 utilizes DB engine 43 to remap the tasks in the service item to provide an updated service item.

DF 40 also creates reports and bills for clients. Reports and bills are created by report manager 50 from information stored in databases associated with processing system 42. Report manager 50 periodically queries the databases, e.g., every five minutes, associated with DB engine 43 and WF manager 44 for an update on all service items for each client. Status and reconciliation reports are stored in report spool 88 and then sent through output manager 48. Output manager 48 directs these reports and bills through an appropriate output channel. While bills may be sent to a printing facility, status reports are communicated as data files with the client. These data files are sent via the Internet 58 to client system 56. Such reports are encrypted and published by FTP server 66 in firewall 60, and pulled off of FTP server 66 by an application called FTP script 100 in client system 60. FTP script 100 decrypts and unpacks communications from FTP server 66. Cron 102 is a standard UNIX facility that is employed to run FTP script 100, scheduling when to access the report file published on FTP server 66. Cron 102 also runs an application called recon 104. Recon 104 performs the housekeeping task of reconciling the service orders with the status reports.

Decrypted DF reports 106 are output from FTP script 100 to web server 92, which directs them to the proper addressee. Like forms 98, DF reports 106 are screens with fields for report information. Decrypted status data is directed from FTP script 100 to a document factory status data base (DF status DB) 108. The client's representatives and on-line customers can check the status of their service orders by accessing the information stored in DF status DB 108 through web server 92 and CGI application 96. CGI application 96 is adapted to receive status queries from users through web server 92 and return status reports through web server 92 to the persons making the status queries.

This information is important to client representatives who need to know the status of their pieces of work at any given time. Every time a work item moves to the next step the status report will change reflect that step. A status report will include each transaction, the time and date of the transaction, and whether the transaction was successful. For example, a status report may show that at 1:00 PM a form was sent to a customer, at 1:30 the document was returned from the customer with proper information filled in the form, at 1:35 a second document was sent to the customer, and that that document has not been returned yet.

Recon 104 reconciles transaction. Each time an e-mail message, such as a service order, is sent from CGI application 94, it is logged by recon 104. Periodically recon 104 runs and looks at DF status DB 108 to check whether DF 40 has confirmed in a status report that this request was made. If the item is reflected in the status report, then recon 104 notes this and no further action is taken. If, on the other hand, recon 104 checks some time after the e-mail is sent and there is no hint of an action being taken by DF 40, there is a good possibility that the e-mail was lost. Recon 104 will then resubmit that e-mail to assure that it will be sent. Thus, recon 104 acts as part of a back-up system to catch items that otherwise might fall through the cracks of the client system 56, DF 40 and the Internet 58.

An important aspect of DF 40 is that it is capable of intelligently processing received documents. Service orders received from client system 56 are already in a computer readable form and are therefore simple to process. However, in completing a transaction, such as, for example, initiating telephone service to a customer of a telephone utility client, several documents may be transmitted and received by DF 40. This service order may require DF to send documents to different departments within the telephone company, e.g., a note to accounting to open the account (which may also require a letter to a credit reporting bureau), a note to the service department to send someone to install wires and confirm operation, a note to the switching center to activate the new line, a note to publishing to list the new telephone number in the next directory, a letter to the new customer confirming the order, a note to marketing to put the new customer on their mailing lists, etc. Some of these documents will be sent electronically, and others will be printed. Some of the parties receiving these documents may need to respond to confirm receipt and/or to indicate completion of their task. For example, the customer may need to sign a service contract, or the wire installer may need to fill out a service form that is given to the customer, a copy of which needs to be tracked internally.

DF 40 is adapted to pick off the relevant information from these types of paper documents and update the service item for that job based on that information. Paper documents, including faxes, letters, and printed forms are input into FILENET/EIP 74. FILENET is a commercially available system for capturing images from documents, and creating data files representing the images. EIP stands for enterprise image platform, which is built on top of FILENET. The image of the document is put into an image file and transferred to FRAME 52.

FRAME 52 is an image recognition engine that is adapted to intelligently review only relevant fields in the image file. This reduces the amount of information that must be reviewed. In some documents, for example, in a standard form contract, only a very limited fraction of the information in the document is relevant to the client and to the completion of a task on a service item. In this example, the only relevant information to the client is the customer's name, the type of contract, and whether or not the contract is signed by the customer. Once the type of contract is known, only a couple of fields need to be scanned. FRAME 52 is adapted to recognize a selected number of standard forms, and to limit the collection of image data from selected portions of those forms.

Figure 4:
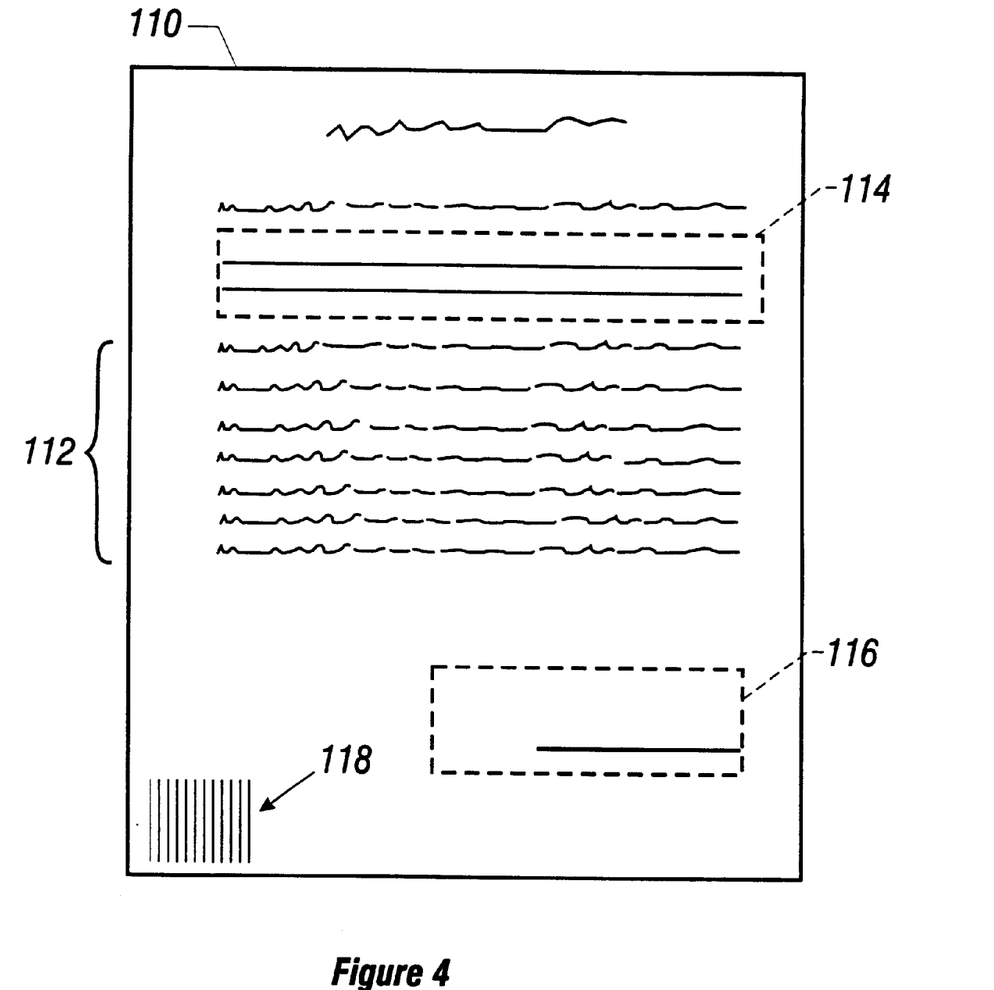
FIG. 4 is a diagrammatic sketch of a paper document representing a standard form contract according to one aspect of the invention.

Referring now to FIG. 4, a single page contract 110 includes standard contract terms 112, a customer ID field 114 for the customer's name and address to be written or typed in, and a signature field 116 for the customer's signature. Contract 110 also includes an identifying indicia 118 that indicates the type of document. Identifying indicia 118 can any pattern that provides identifying information, such as a universal bar code pattern or the like. This information will tell FRAME 52, which is programmed to recognize identifying indicia 118, how many relevant fields are in the document and where they are located. Only this image information is utilized for updating a service item. Some of the contract information can be included in the universal bar code pattern, in addition to information regarding the document type.

FRAME 52 is an image recognition engine, that, like most image recognition engines, is adapted to despeckle, orient and deskew documents. FRAME 52 also interprets the image files received from FILENET/EIP 74. In the example illustrated in FIG. 4, FRAME 52 may be set up to only recognize if a field, such as signature field 116, is filled in on document 110, rather than trying to read the signature. If all the fields are properly filled in and document 110 is in order, FRAME 52 will create or update the service item to which document 110 belongs to indicate proper completion of the corresponding task. If there is an error in document 110, e.g., if signature field 116 is empty, the service item is updated to indicate the error. Processing system 42 then takes the updated service item, updates its data bases and, if there was an error in completing the task corresponding to document 110, remaps the service item so that the task will be repeated. Report manager 54 queries processing system 42 databases and generates the required report, which is saved to report spool 88 and then sent to client system as described above.

The described system has several advantages over other document management systems. Sequences of documents in a multi-step transaction are automatically tracked so that responses are carried out in a timely manner and errors are caught quickly. This enables the transaction to be completed quickly. It is a simple programming step to use the information from automated job tracking to spot common errors and bottlenecks in the system. This enables the system to be adjusted and made more efficient very quickly.

Another advantage is that documents are printed when they are needed in a "just-in-time" fashion. A client's representative or their customer places a service order and semi-custom-tailored documents are prepared in response with minimal human intervention.

The information gleaned from service orders provides a useful data base for marketing and planning purposes.

By working with clients to create better forms, more document reading tasks can be automated, thereby increasing the efficiency of the system. For example, forms can be pre-populated with graphic or other elements at predetermined locations for a customer to input information. This will make it easier to take only targeted information from a document without scanning the entire document. Standard forms can be identified using, for example, bar coded information, which can be used to indicate specific, selected fields in the document containing relevant information to the service item.

By employing a universal service item 30 format for all document tasks, and also employing a system-wide DF API 54 for communicating with each component in the system, system maintenance is minimized.

What is claimed is:

1. A document processing system, comprising:
   a plurality of different document input media;
   a plurality of different document output media;
   a processing system, including a database, a database engine and a workflow manager;
   an input component being adapted to receive communications transmitted from each of the plurality of document input media, the input component including a generalized API being communicatively coupled with the processing system, wherein each received communication includes a request for producing and transmitting at least one communication over a selected one of the plurality of document output media, the input component being adapted to convert the request in each received communication into a service item and to communicate the service items to the processing system, each service item being comprised of a stack of tasks necessary for completing the corresponding request; and
   an output component, including the generalized API, the output component being adapted to receive service items from the processing system, and to direct communications to selected ones of the plurality of document output media in response to the service items.

2. The document processing system of claim 1, wherein the document outputs include a fax system, a print media system, an e-mail system, and an electronic data file transmission system, and wherein the document inputs include the fax system, the e-mail system, and the electronic data file transmission system.

3. The document processing system of claim 2, wherein the e-mail system and the electronic data file transmission system are coupled to the Internet.

4. The document processing system of claim 1, further comprising a document image recognition component adapted to create image data from document hard copies, and further adapted to extract information from selected fields of the image data and to create service items from the extracted information, the image recognition component communicating the service items with the processing system.

5. The document processing system of claim 1, further comprising a report manager component communicating with the processing system, the report manager component being adapted to create activity reports based on information retrieved from data bases in processing system, the activity reports being transmitted through the output component.

6. A method of managing documents being input and output via different media, the method comprising:
   receiving a service order that comprises a request to produce at least one document;
   converting the service order into a service item comprising a group of canonical fields in which information representing different tasks necessary for completing of the service order are placed;
   communicating the service item to a processing system having an associated data base, and storing the service item in the data base;
   communicating the service item to a output component;
   converting at least one task of the service item into instructions for an output component and transmitting the instructions to the output component; and
   producing the requested document with the output component.

* * * * *